US008868296B2

(12) United States Patent
Pyo

(10) Patent No.: US 8,868,296 B2
(45) Date of Patent: Oct. 21, 2014

(54) STEERING ANGLE SENSOR FAILURE DETECTION SYSTEM

(75) Inventor: Jong Hyun Pyo, Seoul (KR)

(73) Assignee: Mando Corporation, Pyeongtaek-Si, Gyeonggi-Do (KR)

( * ) Notice: Subject to any disclaimer, the term of this patent is extended or adjusted under 35 U.S.C. 154(b) by 300 days.

(21) Appl. No.: 13/534,755

(22) Filed: Jun. 27, 2012

(65) Prior Publication Data

US 2013/0006474 A1  Jan. 3, 2013

(30) Foreign Application Priority Data

Jun. 28, 2011  (KR) ............... 10-2011-0062705

(51) Int. Cl.
  *B62D 6/00*  (2006.01)
  *B62D 5/04*  (2006.01)
  *B62D 15/02*  (2006.01)
(52) U.S. Cl.
  CPC ............... *B62D 6/00* (2013.01); *B62D 5/0481* (2013.01); *B62D 15/0235* (2013.01); *B62D 15/024* (2013.01)
  USPC ........... 701/41; 180/422; 340/686.1; 702/185
(58) Field of Classification Search
  USPC ............... 701/41; 180/421, 422; 340/686.3, 340/686.1, 438; 702/183, 185
  See application file for complete search history.

(56) References Cited

U.S. PATENT DOCUMENTS

| 6,429,780 | B1* | 8/2002 | Yazawa et al. ............. 340/686.3 |
| 6,700,343 | B2* | 3/2004 | Masaki et al. ............... 318/434 |
| 7,466,094 | B2* | 12/2008 | Kim ......................... 318/400.32 |
| 8,248,011 | B2* | 8/2012 | Lai et al. .................. 318/400.32 |
| 8,326,489 | B2* | 12/2012 | Oniwa et al. ..................... 701/41 |
| 8,380,398 | B2* | 2/2013 | Kariatsumari et al. ......... 701/41 |
| 8,554,412 | B2* | 10/2013 | Hosoya et al. .................. 701/41 |
| 2003/0020429 | A1* | 1/2003 | Masaki et al. ................ 318/727 |
| 2004/0130284 | A1* | 7/2004 | Lee ................................ 318/439 |
| 2006/0145639 | A1* | 7/2006 | Song et al. .................... 318/254 |
| 2006/0145648 | A1* | 7/2006 | Fujita et al. .................... 318/661 |
| 2008/0047775 | A1* | 2/2008 | Yamazaki ....................... 180/443 |
| 2011/0202239 | A1* | 8/2011 | Maruyama et al. ............ 701/41 |

FOREIGN PATENT DOCUMENTS

| CN | 101883708 A | 11/2010 |
| DE | 102 49 369 A1 | 10/2003 |
| DE | 10 2008 021 847 A1 | 11/2009 |
| EP | 1990254 A2 * | 11/2008 |
| JP | 2010-052656 A | 3/2010 |
| WO | WO 2009105263 A2 * | 8/2009 |

\* cited by examiner

*Primary Examiner* — Tuan C. To
(74) *Attorney, Agent, or Firm* — McDermott Will & Emery LLP

(57) ABSTRACT

The present disclosure relates to a steering angle sensor failure detection system. More particularly, the present disclosure relates to a steering angle sensor failure detection system that can correctly detect a failure of a steering angle sensor which may be caused due to the slipping of a speed reducer.

5 Claims, 2 Drawing Sheets

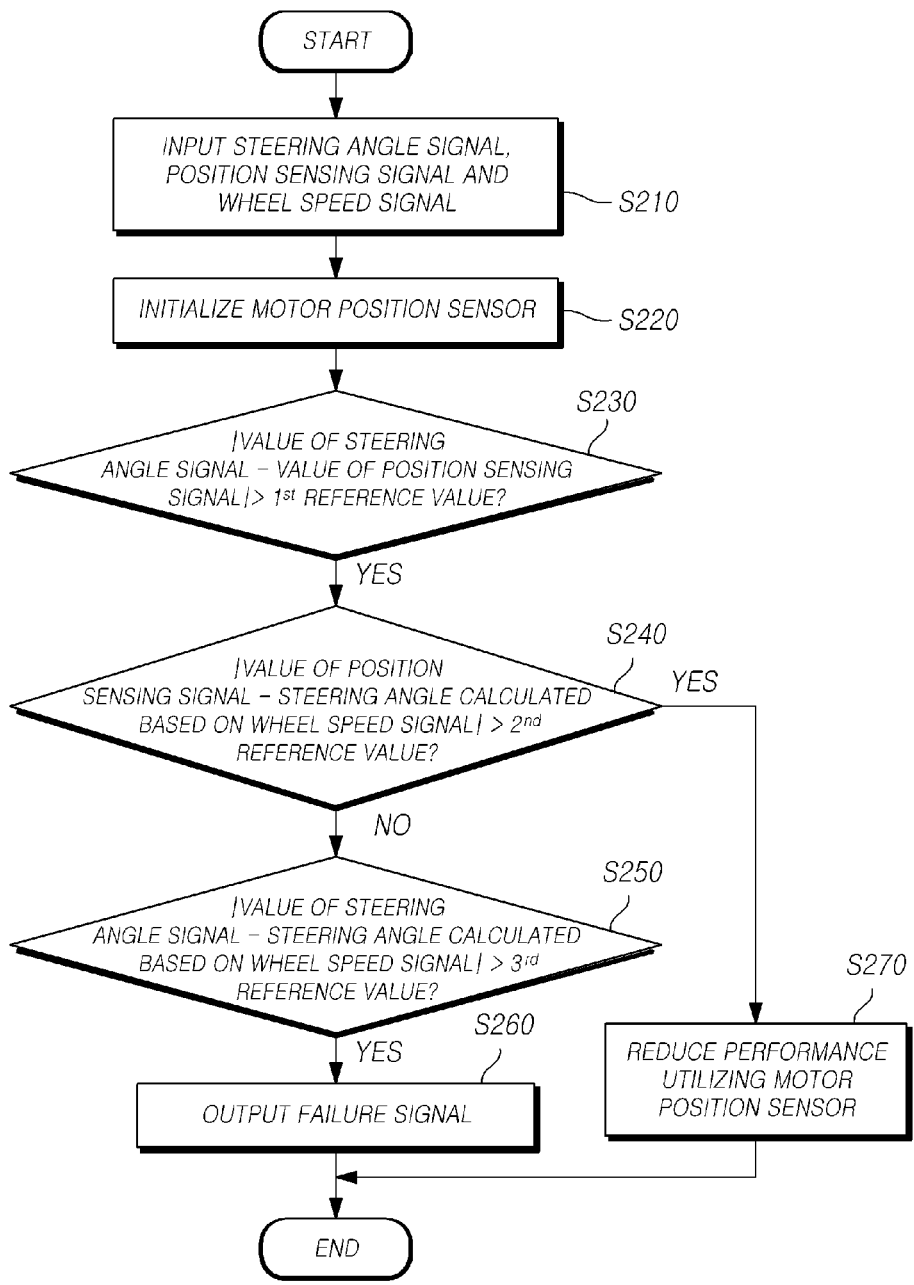

STEERING ANGLE SENSOR FAILURE DETECTION SYSTEM

BACKGROUND OF THE INVENTION

1. Field of the Invention

The present invention relates to a steering angle sensor failure detection system.

2. Description of the Prior Art

As generally known in the art, a steering apparatus of a vehicle means an apparatus that allows a driver to change a driving direction of the vehicle by his/her will. The steering apparatus helps the driver to optionally change the center of rotation, about which the vehicle's front wheels are turned, so as to make the vehicle move in a direction desired by the driver.

A power steering apparatus of a vehicle is an apparatus that when a driver operates a steering wheel of a vehicle, assists the driver's operating force of the steering wheel using a booster, so that the driver can easily change the running direction of the vehicle with less force.

A recent electric power steering apparatus renders the steering wheel of a vehicle to be operated heavily when the vehicle is driven at high speed, but renders the steering wheel to be operated lightly when the vehicle is driven at low speed. A steering angle sensor is employed to assure such an operation of the electric power steering apparatus. Accordingly, there is an increased need for a steering angle sensor failure detection system which can correctly detect whether the steering angle sensor is normally operated or not.

SUMMARY OF THE INVENTION

Accordingly, the present invention has been made to solve the above-mentioned problems occurring in the prior art, and an aspect of the present invention is to provide a steering angle sensor failure detection system that can correctly detect a failure of a steering angle sensor which may be caused due to the slipping of a speed reducer.

In accordance with an aspect of the present invention, there is provided a steering angle sensor failure detection system including: a steering angle sensor configured to output a steering angle signal corresponding to a rotation angle of a steering wheel of a vehicle; a motor position sensor configured to sense the position of a rotator of a motor, and to output a position sensing signal; a wheel speed sensor configured to output a wheel speed signal regarding a wheel speed of the vehicle; and an electronic control unit configured to compare the value of the position sensing signal and a steering angle calculated based on the wheel speed signal when a difference between the value of the steering angle signal and the value of the position sensing signal is larger than a first reference value, to compare the value of the steering angle signal and the steering angle calculated based on the wheel speed signal when a difference between the value of the position sensing signal and the steering angle calculated based on the wheel speed signal is equal to or smaller than a second reference value, and to output a steering angle sensor failure signal when a difference between the value of the steering angle signal and the steering angle calculated based on the steering wheel signal is larger than a third reference value.

The electronic control unit may calculate a turning radius of the vehicle based on the difference in wheel speed between the opposite front wheels or opposite rear wheels.

The electronic control unit may initialize the motor position sensor prior to calculating the difference between the value of the steering angle signal and the value of the position sensing signal.

The initialization of the motor position sensor may be executed with reference to the value of the steering angle signal output from the steering angle sensor.

When the difference between the value of the position sensing signal and the steering angle calculated based on the wheel speed signal is larger than the second reference value, the electronic control unit may reduce a performance utilizing the motor position sensor.

In accordance with the present invention as described above, it is possible to correctly determine whether the motor position sensor fails or not by using a steering angle calculated based on the wheel speed signal as well as the steering angle signal output from the steering angle sensor and the position sensing signal output from the motor position sensor.

BRIEF DESCRIPTION OF THE DRAWINGS

The above and other objects, features and advantages of the present invention will be more apparent from the following detailed description taken in conjunction with the accompanying drawings, in which:

FIG. 2 is a flowchart of an operation of the steering angle sensor failure system of the exemplary embodiment of the present invention.

DETAILED DESCRIPTION OF THE PREFERRED EMBODIMENTS

Figure 1:
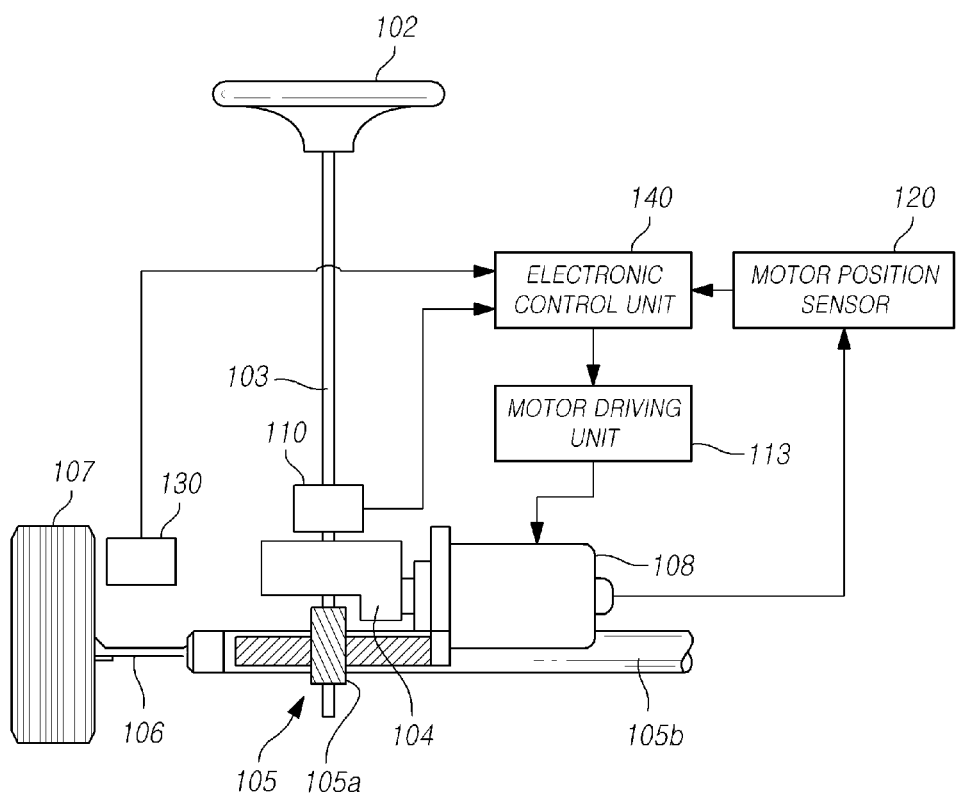
FIG. 1 illustrates a steering angle sensor failure detection system in accordance with an exemplary embodiment of the present invention.

Hereinafter, exemplary embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. Each of these terminologies is not used to define an essence, order or sequence of a corresponding component but used merely to distinguish the corresponding component from other component(s). It should be noted that if it is described in the specification that one component is "connected," "coupled" or "joined" to another component, a third component may be "connected," "coupled," and "joined" between the first and second components, although the first component may be directly connected, coupled or joined to the second component.

Now, a steering angle sensor failure detection system in accordance with an exemplary embodiment of the present invention is described in detail with reference to accompanying drawings.

FIG. 1 illustrates a steering angle sensor failure detection system in accordance with an exemplary embodiment of the present invention. As illustrated in FIG. 1, the steering angle sensor failure detection system in accordance with an exemplary embodiment of the present invention includes a steering angle sensor 110, a motor position sensor 120, a wheel speed sensor 130, and an electronic control unit 140.

The steering angle sensor 110 outputs a steering angle signal corresponding to the rotated angle of the steering wheel 102. In the present exemplary embodiment, various types of steering angle sensors may be employed as the steering angle sensor 110. For example, an optical device type steering angle sensor may be employed as the steering angle sensor 110. When such an optical device type steering angle sensor is employed, a slit plate of the steering angle sensor 110 is rotated when the steering wheel 102 is rotated, and the steering angle sensor 110 outputs a variation of voltage as a steering angle signal, in which the variation of voltage occurs as the slit plate passes or blocks light from the optical device.

The motor position sensor 120 senses the position of the rotator of the motor, and outputs a position sensing signal. For example, the motor position sensor 120 may include a kind of a transformer called as a resolver. When the spindle and rotator of the motor is rotated in a state where the winding of the motor is connected to the primary side of the resolver, the motor position sensor 120 may output a position sensing signal based on a phase of a sine wave appearing in the secondary side of the Resolver depending on a magnetic coupling coefficient of the resolver.

The wheel speed sensor 130 outputs a wheel speed signal related to the wheel speed of the vehicle. In the present exemplary embodiment, various kinds of wheel speed sensors may be employed as the wheel speed sensor 130. For example, the wheel speed sensor 130 may output a wheel speed sensor by counting in every predetermined length of time the number of wheel pulses which are produced as a wheel of the vehicle is rotated. In the present embodiment, the wheel speed sensor 130 may be installed adjacent to each of the opposite wheels of the front wheels and/or rear wheels. For example, the wheel sensor 130 may be adjacent to each of the opposite front wheels in order to measure the wheel speeds of the opposite front wheels.

When the electronic control unit 140 outputs a current control signal to a motor driving unit 113 depending on a steering torque applied to the steering wheel 102 and the vehicle speed, the motor driving unit 113 supplies an electric current corresponding to the current control signal to the motor 108. The motor 108 outputs an auxiliary steering force corresponding to the steering torque and vehicle speed. The auxiliary steering force is transmitted to a pinion 105a through the speed reducer 104 connected to the spindle of the motor. Meanwhile, when the driver operates the steering wheel 102, the rotation force of the pinion 105a is converted into an axial rectilinear force of a rack shaft 105b by the steering torque applied to the steering shaft 103, and changes the running direction of the wheels 107 through a support rod 106. As a result, since the pinion 105a is supplied with the auxiliary steering force supplied from the motor 108 and the steering torque produced in accordance with the driver's operation, the motor 108 assists the driver's steering force required for operating the steering wheel 102.

When the difference between the value of the steering angle signal and the value of the position sensing signal is larger than a first reference value, the electronic control unit 140 compares the value of the position sensing signal and the steering angle calculated based on the wheel speed signal. When the difference between the position sensing signal and the steering angle calculated based on the wheel speed signal is equal to or smaller than a second reference value, the electronic control unit compares the value of the steering angle signal and the steering angle calculated based on the wheel speed signal. When the difference between the value of the steering angle signal and the steering angle calculated based on the wheel speed signal is larger than a third reference angle, the electronic control unit outputs a steering angle sensor failure signal.

The speed reducer 104 transmits the auxiliary steering force through a worm wheel or a belt, in which the speed reducer 104 is designed to be slipped when an excessive auxiliary steering force is applied to the speed reducer 104 from the motor 108. Thus, the difference between the value of the steering angle signal and the value of the position sensing signal that is larger than the first reference value may be caused due to a slip or due to the failure of the steering angle sensor 110. Therefore, the steering angle sensor failure detection system of the present embodiment may confirm the failure of the steering angle sensor 110 by comparing the value of the position sensing signal and the steering angle calculated based on the wheel speed signal.

In the present embodiment, the steering angle may be calculated based on the wheel speed signal. That is, the difference in wheel speed between the opposite front wheels or between the opposite rear wheels is varied depending on the turning radius of the vehicle. For example, assuming that the vehicle turns with a specific speed A, the difference in wheel speed between the opposite wheels is reduced when the turning radius is increased. However, assuming that the vehicle turns with the same speed A, the difference in wheel speed between the opposite wheels is increased when the turning radius of the vehicle is reduced. The electronic control unit 140 in accordance with the present embodiment may calculate the steering angle based on the difference of wheel speeds.

If the difference between the value of the position sensing signal and the steering angle calculated based on the wheel speed signal is larger than the second reference value, the electronic control unit 140 may determine that a slip occurs. In addition, if the difference between the value of the position sensing signal and the steering angle calculated based on the wheel speed signal is equal to or smaller than the second reference value, the electronic control unit 140 compares the value of the steering angle signal and the steering angle calculated based on the wheel speed signal, and outputs a steering angle sensor failure signal when the difference between the value of the steering angle signal and the steering angle calculated based on the wheel speed signal is larger than a third reference value.

In this manner, the steering angle sensor failure detection system in accordance with the present embodiment may judge the occurrence of a slip or the failure of the steering angle sensor 110 by using the steering angle calculated based on the wheel speed signal.

Prior to calculating the difference between the value of the steering angle signal and the value of the position sensing signal, the electronic control unit 140 initializes the motor position sensor 120. The initialization of the motor position sensor 120 is executed on the basis of the value of the steering angle signal output from the steering angle sensor 110. That is, by directly detecting the rotation angle of the steering wheel 102 according to the driver's operation, the steering angle sensor 110 can provide a reliable reference steering angle as compared to the motor position sensor 120 which is affected by the slip or the like. The electronic control unit 140 initializes the motor position sensor 120 by tuning the value of the position sensing signal to the value of the steering angle signal. Then, the electronic control unit calculates the difference between the value of the steering angle signal and the value of the position sensing signal in accordance with the rotation of the steering wheel 102.

Meanwhile, if the difference between the value of the position sensing signal and the steering angle calculated based on the wheel speed signal is larger than the second reference value due to the slip, the electronic control unit 140 may reduce a performance utilizing the motor position sensor 120. For example, the electronic control unit 140 may reduce the performances of an active return function for guiding the steering wheel 102 to be moved to a center position and a soft stop function for controlling the motor or reducing the current of the motor in the vicinity of the maximum rotation angle of the steering wheel.

Next, the operation of the steering angle sensor failure detection system in accordance with the exemplary embodiment of the present invention will be described with reference to FIG. 2.

FIG. 2 is a flowchart of an operation of the steering angle sensor failure system of the exemplary embodiment of the present invention.

The electronic control unit 140 receives a steering angle signal, a position sensing signal and a wheel speed signal from the steering angle sensor 110, the motor position sensor 120 and the wheel speed sensor 130, respectively (S210).

The electronic control unit 140 initializes the motor position sensor 120 with reference to the steering angle sensor 110 (S220).

The electronic control unit 140 determines whether the difference between the value of the steering angle signal and the value of the position sensing signal is larger than the first reference value (S230).

When the difference between the value of the steering angle signal and the value of the position sensing signal is larger than the first reference value, the electronic control unit 140 determines whether the difference between the value of the position sensing signal and the steering angle calculated based on the wheel speed signal is larger than the second reference value (S240).

When the difference between the value of the position sensing signal and the steering angle calculated based on the wheel speed signal is equal to or smaller than the second reference value, the electronic control unit 140 determines whether the difference between the value of the steering angle signal and the steering angle calculated based on the wheel speed signal is larger than the third reference value (S250).

When the difference between the value of the steering angle signal and the steering angle calculated based on the wheel speed signal is larger than the third reference value, the electronic control unit 140 outputs a failure signal for the steering angle sensor 110 (S260).

Meanwhile, when the difference between the value of the position sensing signal and the steering angle calculated based on the wheel speed signal in step S240 is larger than the second reference value, the electronic control unit 140 reduces a performance utilizing the motor position sensor 120 (S270).

Even if it was described above that all of the components of an embodiment of the present invention are coupled as a single unit or coupled to be operated as a single unit, the present invention is not necessarily limited to such an embodiment. That is, among the components, one or more components may be selectively coupled to be operated as one or more units. In addition, although each of the components may be implemented as an independent hardware, some or all of the components may be selectively combined with each other, so that they can be implemented as a computer program having one or more program modules for executing some or all of the functions combined in one or more hardwares. Codes and code segments forming the computer program can be easily conceived by an ordinarily skilled person in the technical field of the present invention. Such a computer program may implement the embodiments of the present invention by being stored in a computer readable storage medium, and being read and executed by a computer. A magnetic recording medium, an optical recording medium, a carrier wave medium, or the like may be employed as the storage medium.

In addition, since terms, such as "including," "comprising," and "having" mean that one or more corresponding components may exist unless they are specifically described to the contrary, it shall be construed that one or more other components can be included. All of the terminologies containing one or more technical or scientific terminologies have the same meanings that persons skilled in the art understand ordinarily unless they are not defined otherwise. A term ordinarily used like that defined by a dictionary shall be construed that it has a meaning equal to that in the context of a related description, and shall not be construed in an ideal or excessively formal meaning unless it is clearly defined in the present specification.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. A steering angle sensor failure detection system comprising:
    a steering angle sensor configured to output a steering angle signal corresponding to a rotation angle of a steering wheel of a vehicle;
    a motor position sensor configured to sense the position of a rotator of a motor, and to output a position sensing signal;
    a wheel speed sensor configured to output a wheel speed signal regarding a wheel speed of the vehicle; and
    an electronic control unit configured to compare the value of the position sensing signal and a steering angle calculated based on the wheel speed signal when a difference between the value of the steering angle signal and the value of the position sensing signal is larger than a first reference value, to compare the value of the steering angle signal and the steering angle calculated based on the wheel speed signal when a difference between the value of the position sensing signal and the steering angle calculated based on the wheel speed signal is equal to or smaller than a second reference value, and to output a steering angle sensor failure signal when a difference between the value of the steering angle signal and the steering angle calculated based on the steering wheel signal is larger than a third reference value.

2. The steering angle sensor failure detection system as claimed in claim 1, wherein the electronic control unit calculates a turning radius of the vehicle based on the difference in wheel speed between the opposite front wheels or opposite rear wheels.

3. The steering angle sensor failure detection system as claimed in claim 1, wherein the electronic control unit initializes the motor position sensor prior to calculating the difference between the value of the steering angle signal and the value of the position sensing signal.

4. The steering angle sensor failure detection system as claimed in claim 3, wherein the initialization of the motor position sensor is executed with reference to the value of the steering angle signal output from the steering angle sensor.

5. The steering angle sensor failure detection system as claimed in claim 1, wherein when the difference between the value of the position sensing signal and the steering angle calculated based on the wheel speed signal is larger than the second reference value, the electronic control unit reduces a performance utilizing the motor position sensor.

* * * * *